INVENTORS
DONIVAN L. HALL
JAMES H. KUZARA
ORVAL J. MARTIN
BY

United States Patent Office 3,506,094
Patented Apr. 14, 1970

3,506,094
ELEVATOR CONTROL PROVIDING PREFERRED SERVICE TO HALL CALLS REGISTERED FOR A LONG TIME
Donivan L. Hall, Toledo, James H. Kuzara, Sylvania, and Orval J. Martin, Toledo, Ohio, assignors to Reliance Electric Company, Toledo, Ohio, a corporation of Delaware
Filed Jan. 20, 1967, Ser. No. 610,576
Int. Cl. B66b 1/22
U.S. Cl. 187—29                                   13 Claims

ABSTRACT OF THE DISCLOSURE

A supervisory control for a group of elevators which establishes preferential service to hall calls registered greater than a predetermined interval. Elevator cars are made available for preferential service from any location in their range of travel if set for down travel and if they have no calls to be served at floors below. One embodiment assigns each car as it becomes available to the oldest unassigned call.

---

This invention relates to elevator group supervisory controls and is particularly although not uniquely adapted for integration in the elevator control system disclosed in United States patent applications Ser. No. 493,973 by Donivan L. Hall and William C. Susor and Ser. No. 494,194 by Donivan L. Hall, William C. Susor and James H. Kuzara both of which were entitled "Elevator Controls" and were filed Oct. 8, 1965.

Heretofore it has been known to time the interval hall calls remain registered and in response to the registration for a certain interval condition the system to expedite service to those calls. These controls have included special signals to alert attendants as the lamps of L. J. Stevens U.S. Patents 2,103,123 of Dec. 21, 1937, and 2,148,913 of Feb. 28, 1939; means to stop and reverse cars traveling in the direction opposite that of the call as in G. Watson et al. U.S. Patent 2,452,342 of Oct. 26, 1948; and means to cause cars to bypass hall calls registered for a short interval when other calls registered for longer intervals are present as in J. H. Borden et al. U.S. Patent 2,771,160 of Nov. 20, 1956. In Crane U.S. Patent 2,664,971 of Jan. 5, 1954, a control is shown which permits each car to respond only to the oldest two or three calls registered in an elevator system.

In each of these systems of the prior art where automatic response of the cars to the calls was provided, the elevators have cruised over their range of travel seeking the call or calls to be given preferential service. Thus a car or cars were conditioned to serve a class of calls which, as the system approached saturation and all calls were registered for the interval required for special service, lost its significance as a special service function. As a result at and near the saturated condition, the preferential service became a general service to virtually all floors on a delayed basis.

In accordance with the present invention, a call registered for greater than a given interval of time is served by a car selected to serve that call. The selected car is permitted to serve only the call for which it was selected until it runs to the floor of that call. After it has been made available to the call, that car is again released to general service.

In view of the individual service to a floor by a car these operations have been likened to the service of taxi to an individual; hence the calls when registered for the requisite period have been termed "taxi calls," the cars when assigned to taxi calls have been termed "taxi cars" and the service of taxi cars to taxi calls has been termed "taxi service."

In order to minimize the disruption of general service by the preferential service of a car, cars are made available for taxi service only when they have concluded their service in the direction of the taxi call. Thus in a situation where taxi service is established for down hall calls registered for a long interval the cars are made available for such service only after they have concluded their down service. In this manner the down peak operation is not interrupted yet cars are provided for taxi service rapidly.

Two modes of assigning taxi calls are considered. Taxi calls are assigned by a scanning process in which the presence of one or more taxi calls initiates the scanning function to scan the floors for taxi calls until a floor having a taxi call is encountered. Thus where several taxi calls are imposed simultaneously, the first call encountered in the scanning operation stops the scanner until the call is assigned to the first car available for taxi service. Following that assignment the scanner continues its scanning to the next call it encounters and is stopped at that call until it is assigned to an available car. Thus overlapping taxi calls are assigned in an order determined by the scanning sequence and thus the spatial distribution of the calls.

Another technique of assigning taxi calls is to assign the oldest call to the next available car. This mode of assignment insures equitable distribution of calls even under conditions of total saturation of the elevator system as where all calls are registered in excess of the interval of a taxi call.

An additional feature of the system involves extending the interval of registration which is required to constitute a call a "taxi call" when the intensity of taxi service increases. This can be done when a predetermined number of cars are assigned taxi service or when the oldest taxi call is registered for a second predetermined taxi extension interval.

An object of this invention is to improve elevator service.

Another object is to serve all hall calls equally as the waiting time for calls increases beyond certain limits indicative of an approach to a saturated traffic condition.

A third object is to provide expeditiously preferential service to a predetermined floor for which a hall call has been registered.

A fourth object is to distribute preferential service to all floors for which it is dictated by service conditions.

A fifth object is to ascertain the oldest call and provide service to that call.

A sixth object is to extend the limiting time intervals for preferential service controls in response to predetermined conditions in an elevator system.

The above and additional objects and features will be more fully appreciated from the following detailed description when read with reference to the accompanying drawings wherein.

The present invention is illustrated as applied to a four car elevator system serving thirteen floors wherein the cars are numbered 1 through 4 and the floors are numbered 1 through 13. It considers taxi calls derived from down hall calls from floors three through thirteen registered for greater than a given interval since floor two is the main entry floor for the structure. However it is to be appreciated that taxi service can be for up taxi calls, and for taxi calls in each direction for taxi calls at selected floors only and that the present combination is chosen for illustrative purposes only.

In much of the disclosure only typical sections of the system are shown, it being understood that these sections, where appropriate, are duplicated for each floor, each car and per floor per car.

The disclosure of FIGS. 3 through 8 is primarily in logic diagram form. In practice the elements of these diagrams are: coincidence gates, ANDs such as AND 22 of FIG. 3, wherein a signal is passed from an output only when signals are present on all inputs simultaneously; OR gates which pass a signal from an output when a signal is present on any input, as OR 49 of FIG. 3; inverters which issue a positive signal from an output in response to a negative input signal and in response to a positive input signal issue a negative output signal, as inverter 23 of FIG. 3; storage means or memories in the form of bistable flip flops, such as flip flop 25 of FIG. 3, which issues a positive signal on its set output "s" when a positive signal is applied to its set input "s" and issues a negative signal at its set output in response to a positive signal on its reset input "rs," and, where provided with a reset output "rs" (as for flip flop 69 of FIG. 4), issues a positive signal on its reset output in response to a positive signal on its reset input and a negative signal in response to a positive signal on its set input. In addition the system includes clocks or astable flip flops such as clock 32 of FIG. 3 which while actuated by an input signal issue output pulses at regular intervals; binary counters which can be a cascaded group of bistable flip flops, as counter 34 of FIG. 3; operational amplifiers as 231 of FIG. 8; and comparators which respond to a coincidence between the signal levels at two inputs, as comparator 233 of FIG. 8. While most of the elements respond to positive true signals, as a coincidence of positive inputs to AND 22 to gate a positive output, certain elements in FIG. 5 differ therefrom. The decoding ANDs such as AND 147 are responsive to a coincidence of negative inputs and the output is inverted internally to produce a positive signal when gated. Thus ANDs symbolized as AND 147 are referred to as inverting, negative ANDs. In addition the quinary stage output ORs while responsive to positive input signals internally invert those gating signals to a negative output. Such inverting ORs are symbolized as OR 145.

The elevator supervisory system with which this invention is illustrated is of the type disclosed in the aforenoted Hall et al. patent applications. Generally it comprises means to assign a hall call to a particular car whereby only the assigned car or another car having a car call for the corresponding floor and serving the direction of the hall call can serve that call. Registration of a hall call is accomplished by a call device such as a push button actuated switch, one of which is provided for up service from each floor but the uppermost, and one of which is provided for down service from each floor but the lowermost. A registered hall call sets a hall call memory individual to the call device and accessible to each car. The call is allocated to a car by a scanner which is set in operation by the presence of an unassigned hall call. The scanner operates in step by step fashion between the floors of the system, scanning the floors in both directions. Coincidence of the scan position and direction with the floor and service direction of an unassigned hall call establishes that call as an allotment call.

A second scanner in an allotter for the system, which is arranged in a preferred embodiment to assign the allotment call to the car in the optimum condition to serve that call, is preset to the floor of the allotment call and conditioned to scan in a direction in opposition to the service direction of the allotment call. This scanner applies pulses to a distance counter for each car to indicate the number of floors the car will be required to traverse to reach the floor of the call. It also identifies the car and hall calls to which each car will be required to respond in traveling to the allotment call and the calls for each car outside the zone of travel between the car and the allotment call. These factors and others such as car loading, special service assignments and state of energization of hoist equipment for each car are also considered. All factors can be scaled to service time so that signals can be summed for each car to indicate that car having the lowest service time for the allotment call.

Assignment of the allotment call to the car having the lowest service time or otherwise indicated to be favorably disposed to serve the call is accomplished by identifying the allotment call floor and direction to a demand memory control for that floor and direction for each car and by actuating the control for the demand memory of the car to be assigned. Thus the coincidence of call identification and car identification effects assignment. A hall call assigned to a car is termed a "demand" as distinguished from a "command," the term applied to a car call registered on a call device within the car and therefore individual to that car.

The cars run only to their commands and demands. Further cars disregard hall calls which are demands for other cars even when traveling past the floor of those calls. When a car stops at a floor as for a command and is set to travel therefrom in the direction of a demand for another car, that stop cancels the hall call memory and the demand for the other car thereby avoiding unnecessary car travel.

A car retains its demand until it provides service in the direction and at the floor of that demand. Then a reset signal is issued to the demand memory and the hall call memory. A demand can be realloted as where the car is delayed or a change of conditions occurs which may offer a more favorable assignment of the hall call.

In peak traffic conditions the cars may be delayed in serving hall calls. For example they may become loaded to capacity and therefore reset those demands which they are incapable of serving. While such demands are reallotted, further delays may be imposed as where the newly assigned car also becomes overloaded before it reaches the floor of the hall call.

Figure 1:
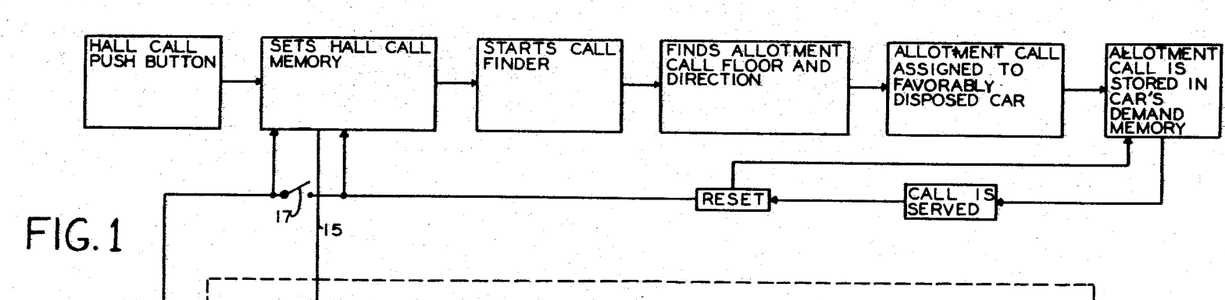
FIG. 1 is a functional block diagram of the invention illustrating its relationship to a typical elevator system and including within the broken line rectangle one embodiment for identifying the taxi call to be assigned wherein spatial distribution of the calls establishes an order of selection.
Figure 2:
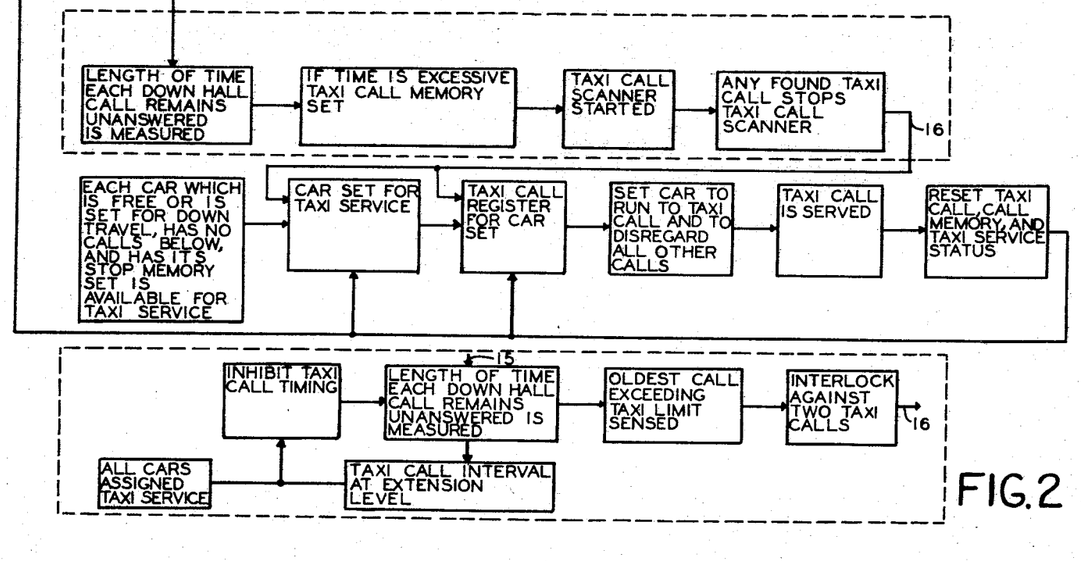
FIG. 2 is a functional block diagram of a second embodiment of that portion of the invention which identifies the taxi call to be assigned as the call having the longest registration interval; this figure can be substituted for the portion of FIG. 1 enclosed by the broken line.
Figure 3:
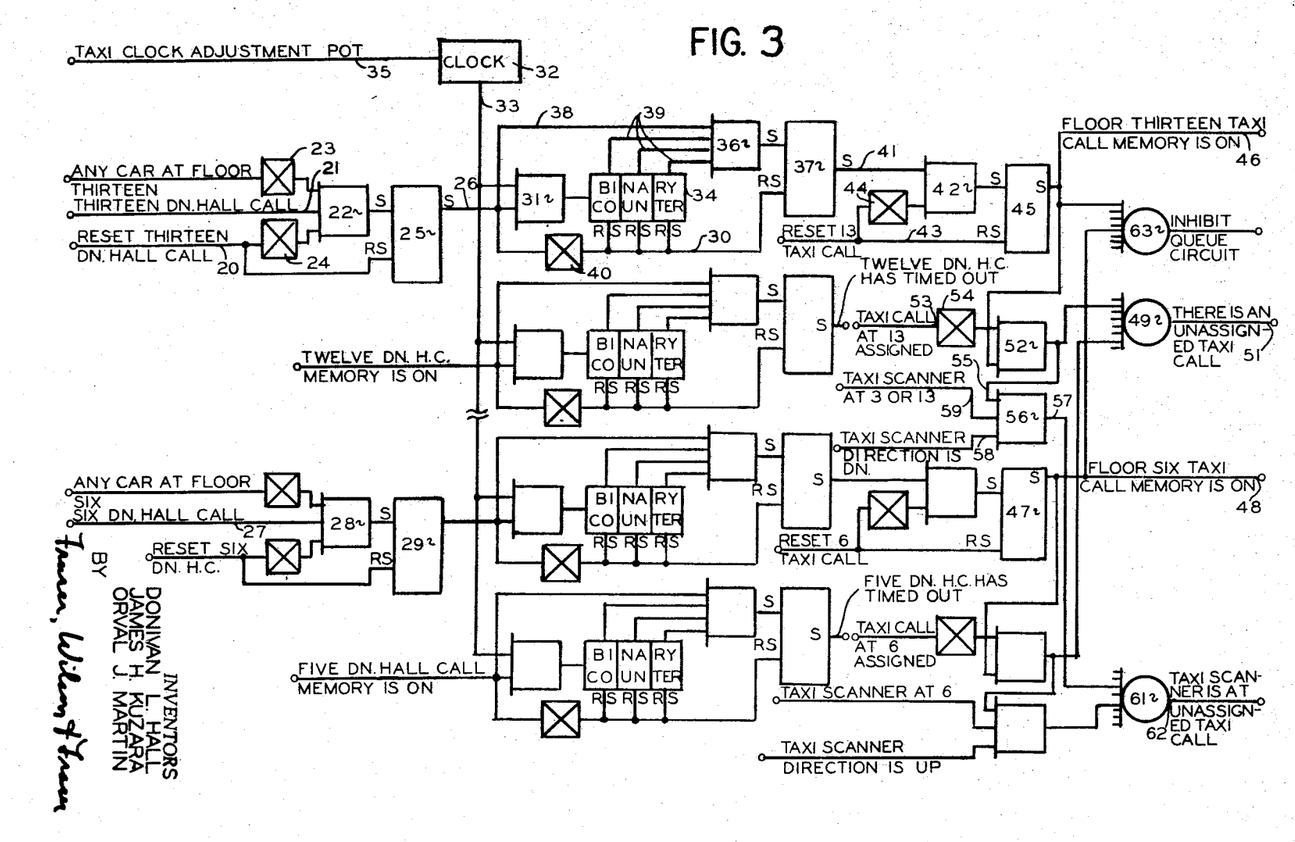
FIG. 3 is a logic diagram of typical down hall call memories for two floors, typical taxi call timers for four floors and typical taxi call memories for two floors.
Figure 8:
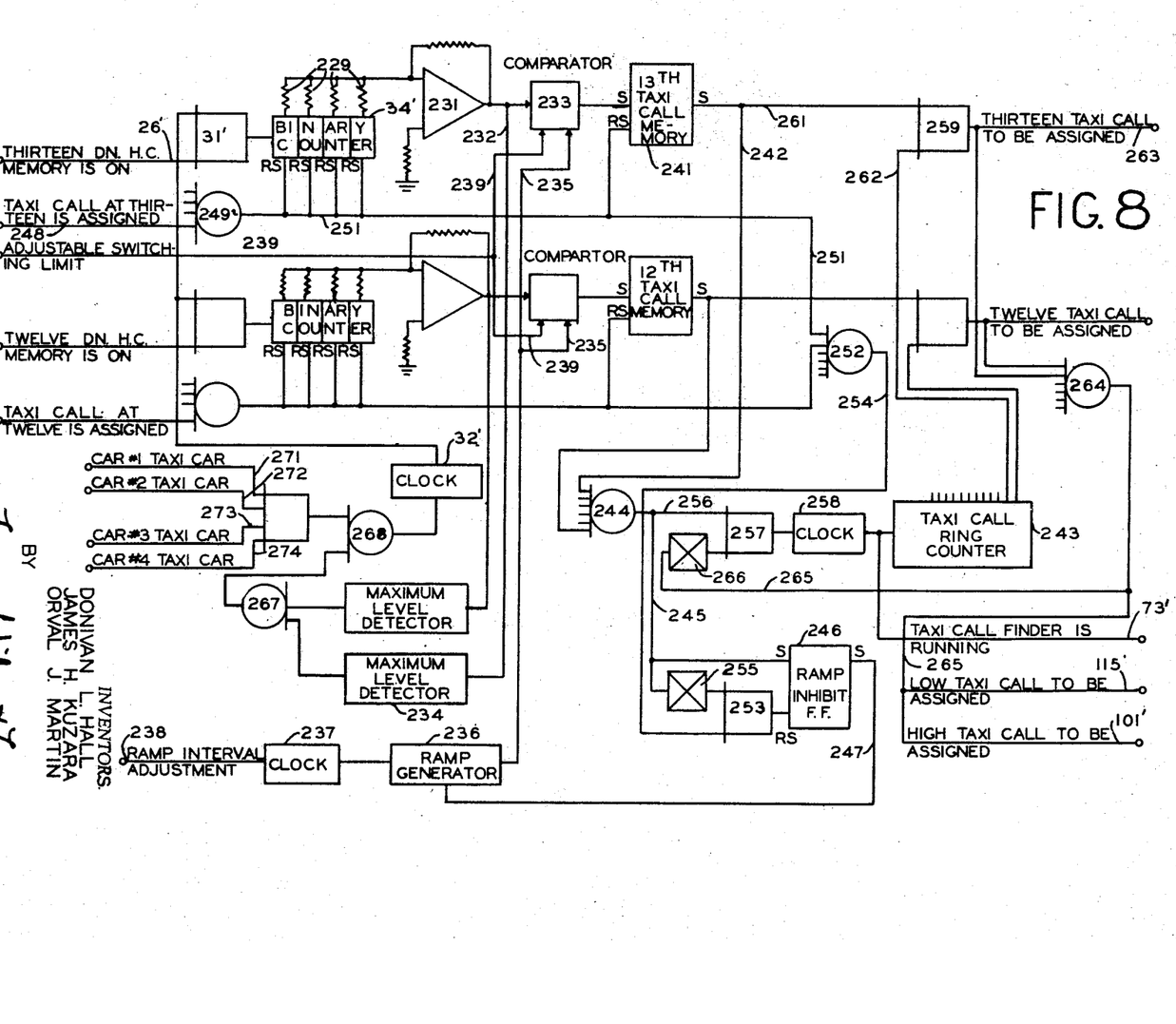
FIG. 8 is a logic diagram of the taxi memories for two typical floors actuated according to a second embodiment of this invention in the order of the length of time the calls have been registered to provide service to the oldest call, together with the auxiliary equipment to avoid multiple selection of taxi calls for assignment and to extend the interval measurements.

According to the present invention the length of time a down hall call remains set in its down hall call memory is measured as over lead 15 as shown in FIGS. 3 and 8 for the embodiments set forth functionally in FIGS. 1 and 2 respectively. When the time exceeds a certain limit the taxi service response to the call is initiated. In the case of the system employing only a limit of time, that of FIG. 1, a taxi call scanner is set in operation. For the thirteen floors of the illustrative system a bidirectional ten position counter is utilized and a serializer or sequencing control, FIG. 4, identifies the direction of scan so that the first decade of floors is scanned while the scanner is operating in an ascending sequence of floors and the second decade of floors is scanned while it is operating in a descending sequence of floors. Thus in the ascending scan sequence of 1 through 10, floors 1 through 10 are scanned for taxi calls and in the descending scan sequence of 10 through 1 no floors are scanned for steps 10 through 4 but steps 3 through 1 permit the scan of floors 13 through 11 for taxi calls.

In the embodiment of FIG. 1, when the taxi scanner position is coincident with a floor for which a down hall call has been registered for the taxi call time, the taxi scanner is stopped to identify the taxi call to be assigned on lead 16. With the taxi memory set, the taxi scanner is inhibited and cars are barred from queue service (a service as disclosed in the patent application filed herewith of Donivan L. Hall, Orval J. Martin and Gerald D. Robaszkiewicz entitled "Queuing Controls for a Group of Elevators" which retains a car at a preferred service floor until particular service requirements are imposed on that car or the system).

In the embodiment of FIG. 2, timing of the down hall call memory is coupled through lead 15 from the primary system of FIG. 1. The oldest down hall call exceeding the taxi call time limit is assigned to taxi service as shown in FIG. 8 by comparing the analog signals of call registration time for each call with a descending ramp signal. As the ramp signal level decreases with time, it ultimately achieves the same level as the taxi time signal of the oldest taxi call, and causes a comparator to issue a set signal to a taxi memory. This institutes a scanning operation in a ring counter which hunts in the manner of the scanner of FIGS. 4 and 5 of the first embodiment until its finds the floor of the taxi memory. This ring counter provides an interlock against the condition where two taxi calls are registered the same length of time and both set their memories at the same ramp signal level. This interlocked and identified taxi call is set for introduction to the taxi register of the car to be assigned taxi service at lead 16 of FIG. 1.

Each of the embodiments sets a car for taxi service only when it is in a condition calculated to provide that service without disrupting the operation of the system. A car is considered available for taxi service if it is in a "free car" status, that is, if it has no calls assigned as demands and no commands. It is also available when it approaches the end of a run downward to the lowest call it is required to serve. One means of ascertaining this is to indicate the car is available for taxi service when it is set for downward travel, has no command or demand memories set for floors below it and has its stop memory set. These conditions occur as the car picks up its lowest call and initiates the slowdown to stop for that call.

Figure 6:
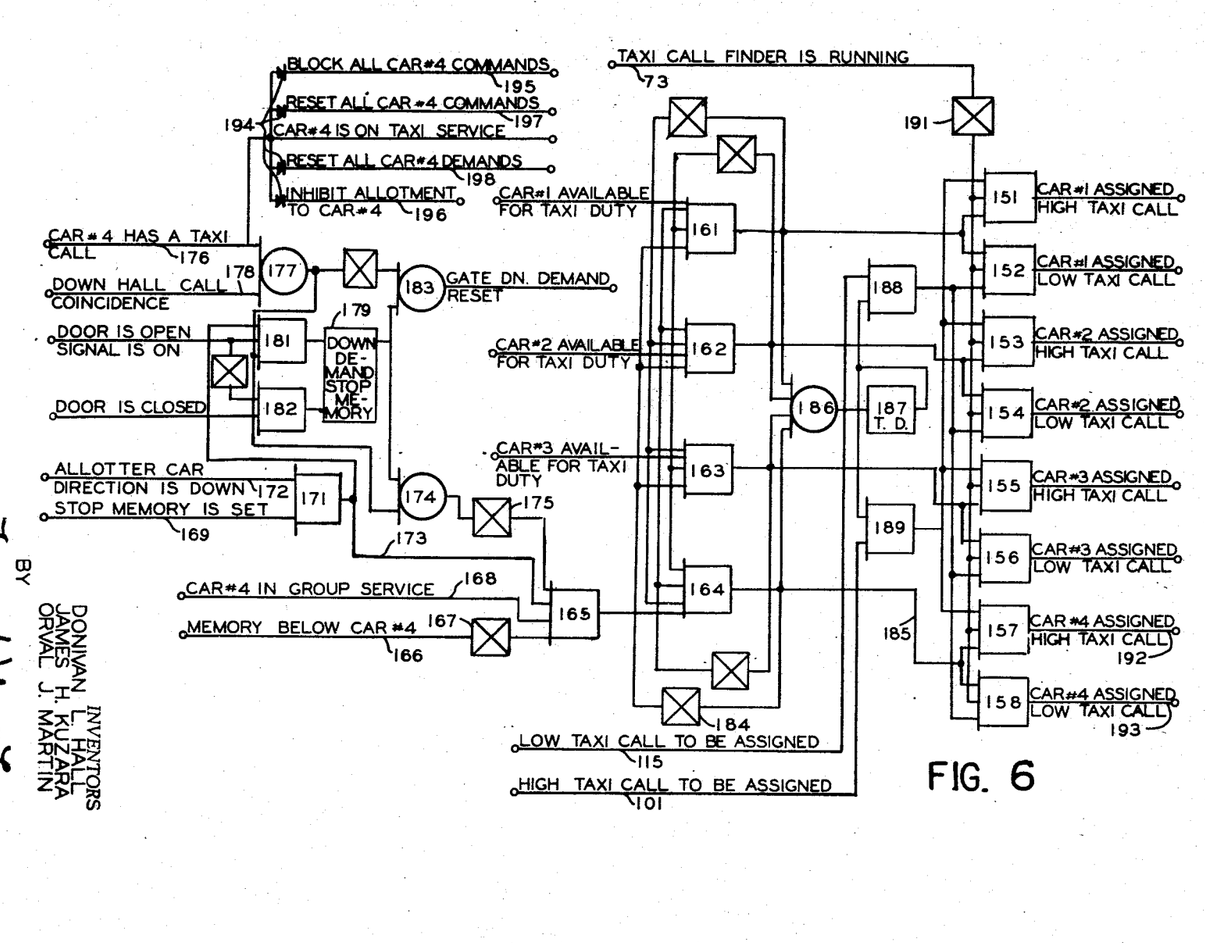
FIG. 6 is a logic diagram of the means for ascertaining the availability of a car for taxi service, the means to enable but one car at a time for taxi service and the means to identify the range of travel in which the taxi call is located.
Figure 7:
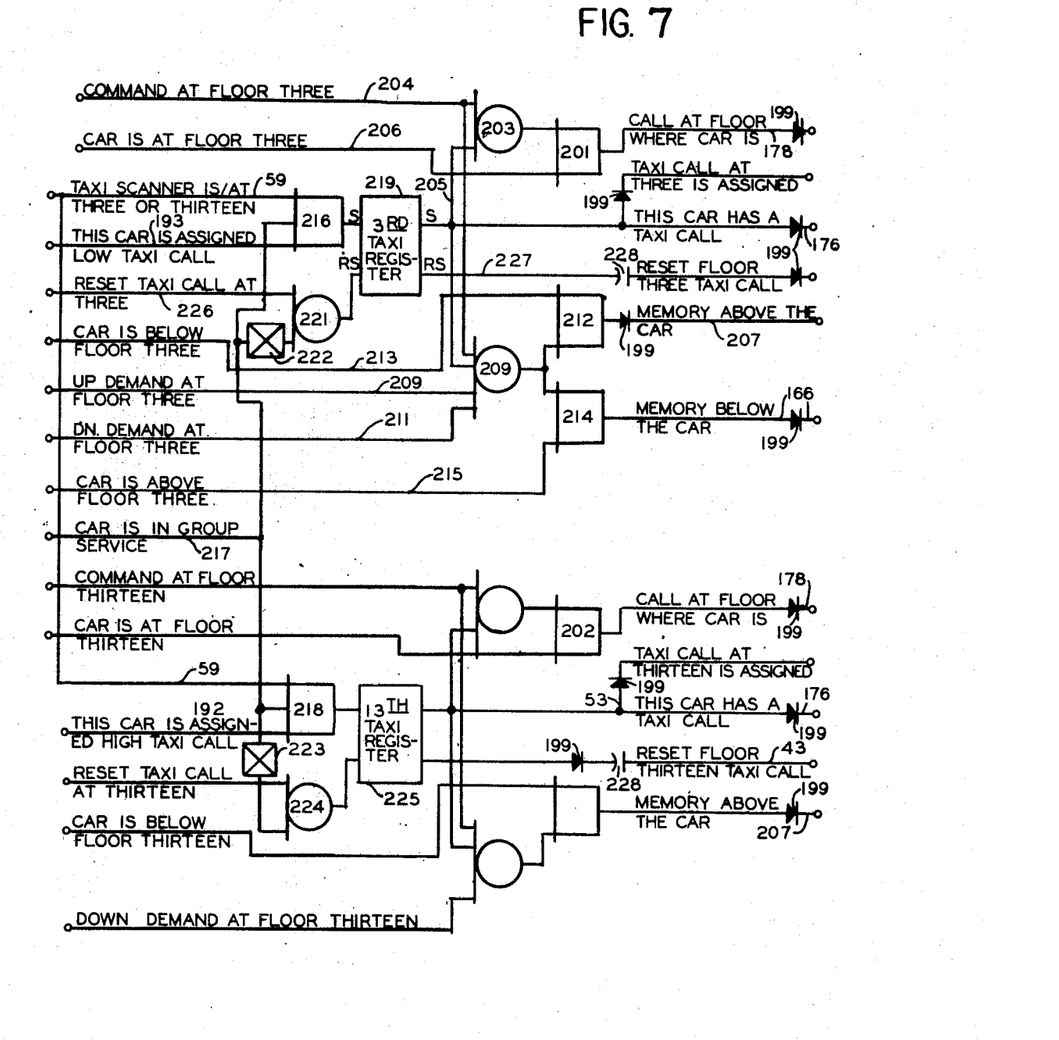
FIG. 7 is a logic diagram of the taxi registers for two typical floors of a typical car.

Coincidence of an available taxi call from the functions within the broken line rectangle of FIG. 1 or from FIG. 2 as passed on lead 16, and a car available for taxi service as sensed in FIGS. 6 and 7 for either of the embodiments of FIGS. 1 or 2 sets a taxi register for the car and floor of the taxi call. Each car has a taxi register for each floor for which taxi service is available, floors three through thirteen in the example. The assignment of a taxi call to a car appropriates that car exclusively to the service of the taxi call. The car is prevented from receiving any allotments of hall calls as demands from the allotter through normal operation of the system, it is prevented from receiving any car calls as commands, and any commands and demands then imposed are reset. Further the car can be assigned but one taxi call. It therefore runs directly to the floor of the taxi call, which may be above or below the car, stops at that floor and sets itself to run in the taxi service direction. At that time it resets the hall call memory, the taxi call memory, and the taxi register and releases itself to normal operation in which it is available to commands from calls within the car and demands as allotted to it by the normal system operation.

The hall call which results in a taxi call ordinarily will be allotted to a car by the normal system operation. Hence, a car can respond to its allotted call and serve the floor. Further, a car having a command for the floor can serve the floor. Such service can be arranged to cancel the hall call memory and demand memory for the car having the call allotment, as for a call which has not been registered the taxi interval, and reset the taxi call registration timer, the taxi call memory, and the taxi register and can release the car from taxi service to that call so that it is returned to normal operation. Where it is found that taxi calls ordinarily or frequently represent the accumulation of full car loads at the floor, the reset of the taxi register in response to the stopping of any car at the floor requiring taxi service when that car is set for the taxi service direction can be inhibited. Under these conditions call reset can be accomplished only by the arrival of the car assigned taxi service at the floor. This insures a car having full capacity will serve the call in addition to any earlier arriving partially loaded car. This alternative is incorporated in the system by closing switch 17 in FIG. 1 to join the taxi service reset with the demand memory reset in a bidirectional coupling to enable a taxi register reset by a non-taxi car.

In the embodiment of FIG. 2, taxi call timing is interrupted for all calls under certain conditions thereby effectively extending the limits at which the interval of call registration actuates the taxi function. When any taxi call interval reaches a second time level substantially above the taxi threshold the taxi clock is inhibited. In addition if all cars are assigned taxi service the clock is inhibited.

Abbreviated representations of down hall call memories are shown for floors six and thirteen in FIG. 3. Registration of a down hall call at the thirteenth floor imposes a positive signal on lead 21 to AND 22 which is gated if no car is at floor thirteen to cause inverter 23 to issue a signal and if no reset signal for a thirteen down hall call is imposed so that inverter 24 issues a signal. AND 22 when gated sets thirteen down hall call flip flop 25 to issue a positive signal on lead 26. In a similar manner a six down hall call signal on lead 27 can gate AND 28 to set six down hall call flip flop 29.

The hall call flip flops when set issue signals to the call finder and allotter to institute a normal allotment of the hall call to a car (by means not shown). They also initiate timing of the interval the call is registered by enabling an AND gate which passes clocked pulses to a binary counter. The set flip flop 25 enables AND 31 for the thirteenth taxi timer so that the clock 32 has its pulses on lead 33 applied to the first stage of binary counter 34. Clock 32 is a multivibrator or astable flip flop having a pulsing frequency determined by the setting of an adjustment potentiometer (not shown) as applied on lead 35. Depending on the setting on lead 35 the pulse rate can be adjusted from one pulse per second to one pulse per fifteen seconds. For example if the clock 32 is set for a six second pulse interval and the counter 34 is a conventional three stage binary counter which sets all stages on the seventh count following reset, the timed interval from the registration of a call to the development of an output from each stage to AND 36 would be between 42 and 48 seconds.

AND 36 gates a set signal to thirteenth taxi timer memory flip flop 37 upon a coincidence of a registered hall call memory indicated on lead 38 and a set condition of each stage of counter 34 as indicated on leads 39.

In like manner every other floor for which taxi service is provided has a timer AND gate responsive to the down hall call memory and passing clock pulses to a binary counter for that floor which at a predetermined count gates a timer setting AND to set a taxi timer flip-flop. Such timers are shown for the typical floors twelve, six and five.

A "thirteen down hall call has timed out" signal is issued by flip flop 37 on set lead 41 to gate taxi memory setting AND 42 provided no "reset 13 taxi call" signal is imposed on lead 43 from taxi register of FIG. 7 so that inverter 44 issues an enable signal to AND 42. When gated, AND 42 issues a set signal to floor thirteen taxi call memory flip flop 45 which issues a "floor thirteen taxi call memory is on" signal on lead 46. Each floor having taxi service has a flip flop for a taxi call memory corresponding to 45 as flip flop 47 for issuing a "floor six taxi call memory is on" signal on lead 48.

The existence of any unassigned taxi call is indicated by gating OR 49 which then issues a "there is an unassigned taxi call" signal on lead 51. OR 49 is gated when any taxi call memory flip flop is set for a floor to which no taxi service car is assigned. Thus the signal on lead 46 gates AND 52 until a car is assigned to the taxi call at which time a "taxi call at thirteen assigned" signal derived from the thirteenth taxi register for the car assigned the taxi call actuates inverter 54 to inhibit AND 52. This signal is developed in FIG. 7.

Figure 4:
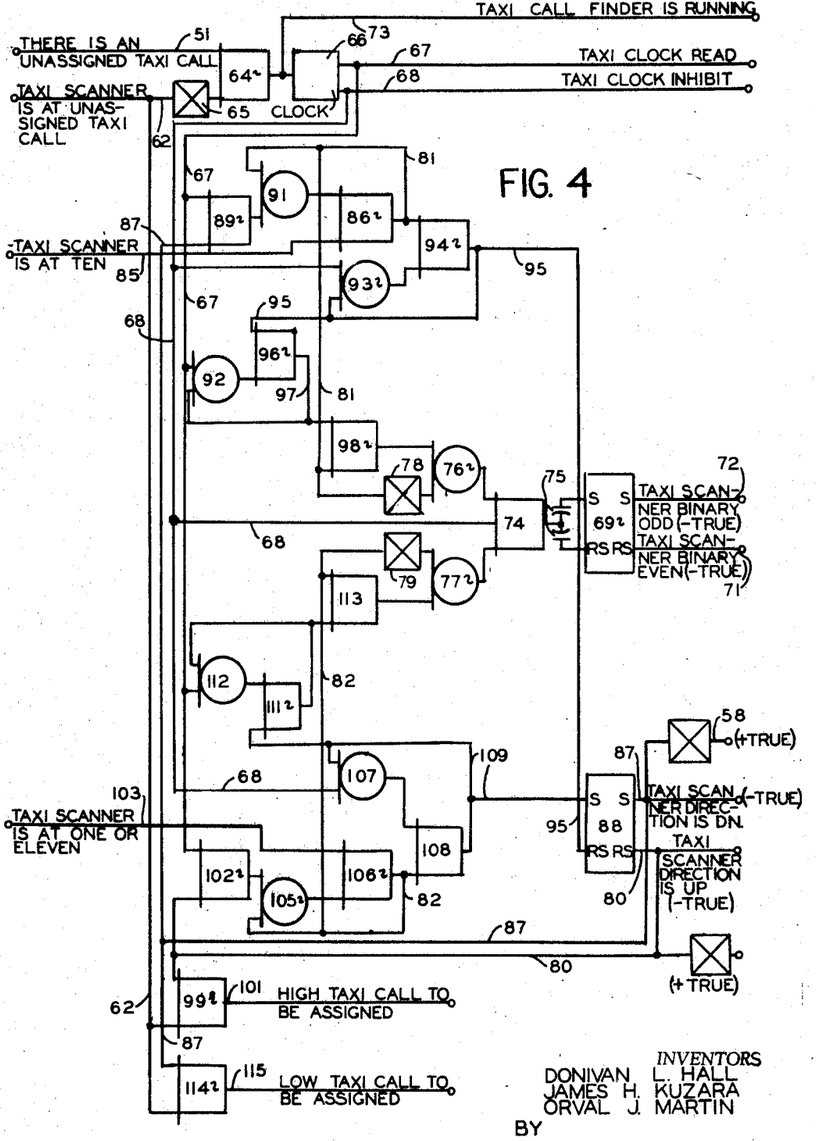
FIG. 4 is a logic diagram of the taxi serializer control for the taxi scanner and taxi call registers.

The "unassigned taxi call at thirteen" signal from AND 52 to lead 55 enters into the gating of AND 56 to issue a "taxi scanner is at the unassigned taxi call at thirteen" signal on lead 57. As will be discussed, a taxi call initiates operation of the taxi scanner of FIGS. 4 and 5 causing it to scan until it reaches a floor for which a taxi call is registered. When it reaches that floor, floor thirteen in the example, as when the scanner is set to advance in a down direction so that a "taxi scanner direction is down" signal derived from FIG. 4 is applied on lead 58 to AND 56 and when the scanner is at its third position to issue from FIG. 5 at lead 59 a "taxi scanner is at three or thirteen" signal to AND 56, that AND is gated. Gated AND 56 gates OR 61 to stop the scanner at its third position while set for a down count by an inhibiting signal "taxi scanner is at unassigned taxi call" on lead 62.

Any unassigned taxi call will gate OR 49 to start the taxi scanner and any coincidence of the taxi scanner position and direction with an unassigned taxi call will inhibit the taxi scanner by gating OR 61. When the taxi call is assigned to a car, as the thirteenth floor call, to impose a signal on lead 53, inverter 54 inhibits AND 52 to inhibit AND 56. If no other unassigned taxi calls are imposed, ORs 49 and 61 are no longer gated and the scanner remains dormant. If other taxi calls are present an AND corresponding to 52 will be gated to gate OR 49 and the scanner will be restarted until it finds another unassigned taxi call. When the unassigned taxi call is found an AND corresponding to 56 for the floor of that call is gated to gate OR 61 and inhibit the scanner until that call is assigned to a car available for taxi service.

While any taxi call is registered the elevators of the system should be employed to their maximum capacity. One operating mode which retains a car at a special service floor, as at the main landing, so that it is immediately available to passengers entering the system at the main landing reduces the amount of service which is provided. This type of operation called queue service is prevented while a taxi call is in registration since each taxi call memory output, as those on leads 46 and 48 for floors thirteen and six, gates OR 63 to pass an "inhibit queue circuit" signal to the queue circuit (not shown).

Reset of the hall call memory is accomplished as a car slows to stop at the floor of the hall call provided it is set to depart from the floor in the service direction of the hall call. This conventional reset as applied to lead 20 for the down hall call memory for floor thirteen is responsive to any car. Thus the car allotted the down hall call would cause the reset if stopped, a car having a command for floor thirteen and set to run downward from that floor would cause a reset if stopped, and a car assigned the taxi call for floor thirteen when it stops at that floor, and is then set for down travel from the floor will cause a reset. When the down hall call memory is reset it resets the taxi timer. In the case of floor thirteen the removal of the positive signal on lead 26 inhibits ANDs 31 and 36 and results in a positive signal on lead 30 from inverter 40 to the reset inputs to each stage of binary counter 34 and of taxi timer flip flop 37.

It should be noted that the reset of the taxi call memories is accomplished only by the response of the taxi car. This will be discussed in detail with respect to the operation of the taxi register of FIG. 7 since the taxi call reset signal is derived therefrom. Thus in the present arrangement of FIG. 3 once a down hall call sets its taxi memory that floor is assured service by an empty car since a taxi car must provide this service and a taxi car has no other load. This means that a partially loaded car will frequently serve the registered call and cancel the hall call memory and thereafter the taxi car will also serve that floor to cancel the taxi call memory.

If it is desired to permit the service of any car to terminate taxi service, this can be accomplished readily by connecting the taxi timer reset, as lead 30 for floor thirteen, to the taxi memory reset, as lead 43 for floor thirteen.

Figure 5:
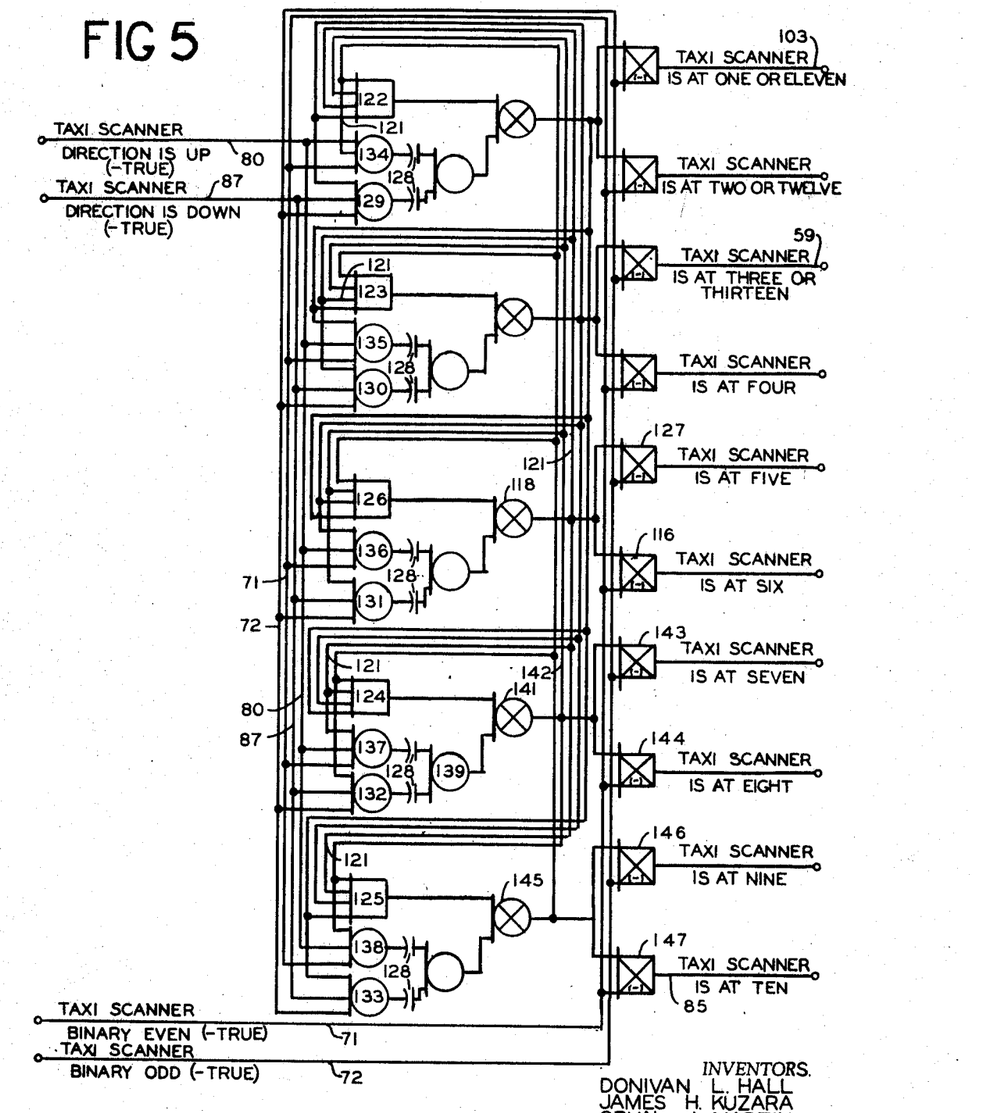
FIG. 5 is a logic diagram of one form of taxi scanner.

The taxi scanner serializer is shown in FIG. 4 and the scanner in the form of a biquinary counter is shown in FIG. 5. The serializer controls the clocking of the counter so that it is issued advancing pulses when an unassigned taxi call is registered until the scanner is at an unassigned taxi call. It responds to the advance of the scanner to its limits to cause a double count at limits as utilized in the ascending and descending counts. It identifies odd and even binary counts and the direction of scan for the scanner. When a coincidence of a scan position and a taxi call occurs, the serializer indicates the call as a high or a low call to the car assignment circuits of FIG. 6 which identify the car to which the taxi call is to be assigned and the zone in which the taxi call is located. The scanner of FIG. 5 identifies ten scan positions as utilized in either the first or second decade of floors for locating taxi calls.

An unassigned taxi call on lead 51 gates AND 64 of FIG. 4 to cause the scanner to run until it finds an unassigned taxi call, thereby imposing a signal on lead 62 which, through inverter 65, inhibits AND 64. While AND 64 is gated, clock 66 issues at timed intervals a positive read signal on lead 67 and in a 180° phase relationship thereto a negative inhibit signal on lead 68. These signals control the state of taxi scanner advance flip flop 69 to alternately enable an odd and even binary count to the biquinary counter of FIG. 5 on leads 71 and 72. An inhibiting signal is imposed on the car assignment ANDs of FIG. 6 while the taxi call finder is running since AND 64 in addition to enabling clock 66 also issues a signal on lead 73 to FIG. 6.

The scanner of FIG. 5 alternately scans in an ascending and a descending order and has its scan positions correlated with the floors so that from scan position one the scan is one through ten for floors one through ten and then ten through one. The descending scan is of no effect until it reaches position three. From three through one the scan is effective for floors thirteen through eleven. Clock 66 is normally held in the read mode, that is with a positive signal on lead 67 and a negative signal on lead 68. It can advance the scanner only when in the inhibit mode with lead 67 negative and lead 68 positive. Scan advance is accomplished by gating a positive signal through AND 74 as the positive going leading edge of the signal is passed by capacitors 75 to the set and reset leads s and rs of flip flop 69. That signal is effective to transfer the state of flip flop 69 since, if reset, the set input responds to the signal and, if set, the reset input responds. Clock inhibit pulses are gated by AND 74 when the scanner is at other than its limits since both of ORs 76 and 77 are gated by their inverters 78 and 79 which respond to an absence of a signal on lead 81 when the scanner is not at ten and an absence of a signal on lead 82 when the scanner is not at one.

For illustrative purposes assume taxi calls simultaneously at three and thirteen with the scanner last located at six and scanning upward. This assumes that the binary flip flop is in its set state to issue a positive signal on lead 72 and a negative signal on lead 71 and that the directional flip flop 88 is set to issue a positive signal on lead 87 and a negative signal on lead 80. Gating of AND 64 by the taxi calls causes the clock transfer to its inhibit mode so that a positive impulse on lead 68 is gated through AND 74 to transfer flip flop 69 and advance the scan to seven. Each succeeding inhibit mode of the clock advances the scan in an ascending sequence until a "taxi scanner is at ten" signal is issued from lead 85 of FIG. 5 to AND 86 of FIG. 4. On the next half clock cycle, while the read mode is effective to impose a positive signal on lead 67, since the taxi scanner direction is up and a positive signal is issued from the set output 87 of flip flop 88. AND 89 is gated to OR 91 which passes a gating signal to AND 86. AND 86 latches itself through lead 81 to OR 91 and disables inverter 78 whereby OR 76 is no longer gated by the inverter. This inhibits AND 74 so that no transfer of the flip flop 69 occurs during the half cycle of the inhibit mode and the scanner remains at ten. In the next clock cycle the inhibit mode is again imposed and the positive signal on lead 68 gates OR 93. AND 86 remains latched even though AND 89 is inhibited, hence AND 94 is gated to issue a reset signal on lead 95 to scan direction flip flop 88. The signal on lead 95 is applied to OR 93 to latch AND 94 and is applied to enable AND 96.

Direction flip flop 88 is inverted by the signal on lead 95 to issue a negative signal on lead 87 and a positive signal on lead 80 whereby the serializer indicates in negative true logic for the scanner of FIG. 5 that the taxi scanner direction is down. If coincidence with a taxi call occurs during the down scan, the call is identified as being in the high zone of floors. The next read half cycle of the clock gates OR 92 with the positive signal on 67 to gate AND 96. AND 96 latches itself through lead 97 to OR 92 and gates AND 98. With ANDs 96 and 86 latched AND 98 remains gated to gate OR 76 for the next clock inhibit pulse on lead 68 whereby AND 74 is gated to transfer flip flop 69 and advance the scanner count from ten to nine.

Removal of the positive signal "taxi scanner is at ten" from lead 85 inhibits AND 86 to release its latch through OR 91 and inhibit ANDs 94 and 98. With no signal on lead 95, AND 96 is inhibited and releases its latch through OR 92. Hence the OR 76 is again gated by the response of the inverter 78 to the absence of a signal on lead 81. It will be noted that OR 76 was not gated for the first clock cycle after the scanner reached its limit, the tenth floor cycle, whereby the second clock cycle of a read and an inhibit mode occurs while the scanner remains at its tenth position. This permits the initial portion of a second series of scan positions to be read. If twenty floors were to be scanned the twentieth floor would be read for taxi calls during the read mode.

With the direction flip flop 88 set for scanning downward, (a negative signal on lead 87) the scanner will advance downward one floor during each inhibit mode half cycle of clock 66 until the scanner reaches the third position and issues on lead 59 a "taxi scanner is at three or thirteen" signal to AND 56 of FIG. 3. Since the scanner direction is down, as indicated by the positive true signal "taxi scanner direction is down" on lead 58, AND 56 is gated to gate OR 61 which issues a "taxi scanner is at unassigned taxi call" signal on lead 62 to inverter 65 of FIG. 4. Inverter 65 therefore inhibits AND 64 to stop clock 66 in its read mode and hold the scanner for floor thirteen until a car is available for taxi service and is assigned the thirteenth floor taxi call.

Assignment of a car will be considered in detail below. It should be noted that the assignment zone of floors is identified as a high call by gating AND 99 by a coincidence of positive signals on leads 62 and 80. AND 99 issues a signal "high taxi call to be assigned" on lead 101 to the taxi car assignment controls of FIG. 6.

After a car has been assigned the thirteenth floor taxi call, AND 52 of FIG. 3 is disabled to cancel the signal from AND 56 and OR 61 thereby removing the inhibit to AND 64 of FIG. 4. Since the assumed condition included a taxi call at floor three a "there is an unassigned taxi call at three" signal is imposed on OR 49 of FIG. 3 to gate AND 64 of FIG. 4 and restart clock 66.

With the scan direction down AND 102 is gated each time the clock is in the inhibit mode without effect until the scanner reaches its first position to issue a "taxi scanner is at one or eleven" signal on lead 103 of FIG. 5. As at the upper scan limit, at the lower limit the scanner remains for two counts by inhibiting the application of an advance impulse to flip flop 69 for the first clock cycle whereby that cycle is employed to read the condition at floor eleven and the second cycle is employed to read the condition at floor one.

During the read mode of the first clock cycle while the scanner is at one AND 102 is gated to OR 105 to gate AND 106 and applies a latch at 82 through OR 105. The signal on lead 82 terminates the gating signal to OR 77 from inverter 79 hence the next inhibit mode signal is blocked at AND 74 to avoid advance of the scanner. The following read mode signal on lead 68 gates OR 107 to gate AND 108 whereby a set signal is applied on lead 109 to direction flip flop 88 to transfer it to a "taxi scanner direction is up" signal. The positive signal on lead 109 provides a latch through OR 107 to AND 108. It also enables AND 111. Upon the introduction of the inhibit mode, OR 112 is gated to gate AND 111 and AND 113. AND 113 gates OR 77 whereby AND 74 pulses flip flop 69 and transfers its state. The scanner then advances to position two removing the enable signal from AND 106 to reset ANDs 108, 111 and 113 and remove the signal on lead 82 to inverter 79 whereby the inverter gates OR 77.

When the scanner advances to the third position while set with an up scanning direction a "taxi scanner is at unassigned taxi call" signal is issued on lead 62, the scanner clock is inhibited and a "low taxi call to be assigned" signal is issued from AND 114 on lead 115 of FIG. 6.

The counter of FIG. 5 responds to the assumed conditions by enabling in its decoder section the output ANDs of the even count when a negative signal is applied to the lead 71 and by enabling the odd numbered output ANDs when the negative signal is on lead 72. With the scanner at six as assumed for the above example inverting negative AND 116 is gated by the negative signal on lead 71 and a negative signal from inverting output OR 118 of the third quinary stage. The outputs of the decoding ANDs are inverted by an internal inverter to make them consistent with the other logic elements.

The first, second, fourth and fifth quinary sections are inhibited by the negative signal from inverting OR 118 of the third section as applied on lead 121 to the quinary sustaining ANDs 122, 123, 124 and 125 of the first, second, fourth and fifth sections respectively. This results in a negative output from each of these ANDs to the inverting output OR of each quinary stage to inhibit those ORs whereby they each issue a positive signal. Sustaining AND 126 of the third stage is gated by the positive inputs from each of the inhibited inverting output ORs of the other stages. AND 126 applies a positive signal to inverting OR 118 to hold that OR gated.

When the scanner clock is placed in operation to transfer states in binary flip flop 69, lead 71 becomes positive and 72 negative. AND 127 for position five is gated momentarily but is immediately thereafter inhibited. During this interval the clock inhibit mode is effective to avoid a false readout.

Transfer of position in the scanner is by the imposition of a positive pulse from an up or down transfer OR through a coupling capacitance 128 to momentarily gate a primary transfer OR. This requires the absence of any positive signal on the directional transfer OR initially, since if the OR is previously gated an additional gating signal can produce no transient in its output.

With an up direction set the positive "taxi scanner direction is down" signal on lead 87 holds all down transfer ORs 129, 130, 131, 132 and 133 gated and thus ineffective. The signal from the inhibited, inverting output ORs of the first, second, fourth and fifth stages hold the up transfer ORs 135, 136, 138 and 134 gated and ineffective. However, gated inverting output OR 118 imposes a negative signal on OR 137. At the time preceding binary inversion the other inputs 80 and 71 to OR 137 are also negative and the OR is not gated. The inversion to a positive signal on lead 71 therefore gates the only ungated directional transfer OR, the fourth binary up transfer OR 137, to pulse fourth quinary transfer OR 139 thereby gating inverting output OR 141 for the fourth quinary stage.

OR 141 when gated issues a negative signal on lead 142 to the sustaining ANDs of all other stages thereby inhibiting AND 126 to inhibit inverting output OR 118. This inhibits AND 127 to remove any scan signal for position five. The negative signals on leads 142 and 72 gate AND 143 to indicate "taxi scanner is at seven." During the read mode of the clock 66 this is effective in the taxi control functions.

The next inversion of binary flip flop 88 imposes a negative signal on lead 71 and a positive signal on lead 72. In these conditions all directional transfer ORs except 138 are gated prior to the transfer since the down transfer ORs 129, 130, 131, 132 and 133 are gated from lead 88 and the inhibited, inverting output ORs of all but the fourth stage inhibit the up transfer ORs of all but the fifth stage, OR 138. The negative signal on lead 71 has no effect on OR 138 at this time but does gate decoding, negative, inverting AND 144 to position the scanner at eight while the positive going signal on lead 72 inhibits negative, inverting AND 143.

Inversion of the binary flip flop 69 to the odd count, negative lead 72 and positive lead 71, gates up transfer OR 138 for the fifth quinary stage thereby gating its inverting output OR 145 to inhibit ANDs 122, 123, 126 and 124 and enable negative inverting ANDs 146 and 147. This inhibits negative, inverting AND 144 and gates negative, inverting AND 146 for a nine count.

After the second clock cycle for the ten count the signals on leads 87 and 80 are inverted by directional flip flop 88 and the binary flip flop is inverted. This permits two read mode cycles at ten followed by a scanner step to nine. The next step is through the fourth quinary stage and a binary even to eight. Transfer between quinary stages in the descending count is by the enabled down transfer ORs 129, 130, 131, 132 and 133. Thus only OR 132 of the fourth quinary stage is inhibited during the tenth and ninth counts so that in the even binary signal following count nine the fourth quinary receives a transfer pulse.

The count proceeds downward to scan position three. As assumed, an unassigned taxi call at thirteen is then in coincidence with a down scanner direction, and a taxi scanner at position three to inhibit the scanner clock until a car is assigned taxi service at thirteen. The scanner then continues to run downward to one position, hold that position for two clock cycles and proceed upward to position ten. Again a coincidence of scan position three, scanner direction is up and unassigned taxi call at three impose a clock inhibiting "taxi scanner is at unassigned taxi" call from OR 61 to inverter 65. This stops the scanner clock until a taxi car is assigned this call and another unassigned taxi call is imposed.

The assignment of a taxi call to a car once it is located by the taxi scanner is accomplished by identifying the car to be assigned and the zone of floors containing the taxi call by gating the car assignment ANDs 151 through 158 of FIG. 6. A single car and a single taxi call are made available to these controls at any one time. The scanner isolates the taxi call. Only one car has access through the car available ANDs 161 through 164 which are interlocked.

Cars are indicated as available for taxi assignment by gating a signal to their car available ANDs 161 through 164 for cars 1 through 4 respectively. A "car #4 available for taxi duty" signal is derived from AND 165 as typical of the output of each car's available for taxi service controls. These controls are effective to gate the AND when the car is a down traveling car with no command or demand memories for floors below. Such a condition occurs as the car picks up its slowdown signal for its lowest call and cancels that call (by means not shown). Since a car can serve but one taxi call at any instant and since it can run downward to that taxi call another constraint is that the call to which the car is slowing is not a taxi call. A dormant car having no calls assigned, termed a "free car," can also be assigned taxi duty.

AND 165 is gated when these conditions are met. Thus if car #4 has a command memory set at a floor, or an up demand memory, a down memory or a taxi register set for any floor below that floor at which the car is located, a positive signal is imposed on lead 166 from FIG. 7 and inverter 167 imposes an inhibit on AND 165 in response to this "memory below car #4" signal. The absence of such a signal causes inverter 167 to partially enable AND 165. If car #4 is in group service a positive signal on lead 168 partially enables AND 165. When car #4 is set to stop for a call to set its stop memory (not shown), a positive signal is imposed on lead 169 to enable AND 171. If car #4 is set to run downward and the run is not to a call requiring service upward as by a low call reversal its car control issues a positive signal to lead 172 (by means not shown). A coincidence of signals for a down stop thus gates AND 171 from leads 169 and 172 to lead 173 to further enable AND 165.

The car is indicated as available for taxi service if OR 174 is not gated to cause inverter 175 to inhibit AND 165 at a down stop where no memory is below the car. Car #4 is unavailable for taxi duty if it has a taxi call as signaled on lead 176 to OR 177 or if it is at a floor for which a down hall call is registered to issue a "down hall call coincidence" signal on lead 178 to OR 177. Subsequent to a stop the down demand stop memory, flip flop 179 also holds OR 174 gated to prevent assignment of a car to taxi service. This stop memory is set by gating AND 181 when the car has stopped at a down hall call, its doors are open and it is set for further down travel. It is reset when the doors are closed to gate AND 182 provided no door open signal is imposed. With the down demand stop memory set or with no down hall call coincidence OR 183 is gated to issue a "gate down demand reset" signal.

The system to which the present embodiment of the taxi service control is applied places a car in a "free car" status when it has no commands imposed upon it and no demands have been allotted to it. A free car fits the control logic by having its allotter car direction set for both up and down, thus it provides a signal on lead 172. A free car is stopped at a floor. If it had no command or demand, this stop requires no access to the car and the car doors remain closed (by control means not shown). If the stop is to serve a command and no entering passenger at the floor registers a new command and no further demands are imposed upon the car, it will close its doors and remain at the floor awaiting an allotment or taxi call. Thus a "free car" has its stop memory set to gate AND 171, it is in group service to impose an enabling signal on lead 168. By definition a "free car" has no memory below the car and no signal on lead 166.

A "free car" has no signal to OR 174. Thus it has no taxi call or down hall call coincidence to gate OR 177. No door open signal is on to gate AND 181 and set the down demand stop memory 179. Since a free car's doors are closed and no door open signal is imposed, AND 182 is gated to reset the down demand stop memory. With neither a set down demand stop memory nor a call imposed OR 174 remains ungated, hence an enable signal is issued to AND 165 by inverter 175 and a "free car" is also indicated as available for taxi duty by gating AND 165 or its equivalent for other cars.

When AND 165 is gated to indicate a car is available for taxi duty, that car is assigned if a "taxi call to be assigned" signal is present on lead 101 or 115. Car #4 when available gates AND 164 provided no other car available AND 161 to 163 is gated. If another car is gated its cross inhibit is effective through an inverter to inhibit all other car available ANDs. Thus with car #4 the gating of AND 164 causes inverter 184 to inhibit ANDs 161, 162 and 163 for all other cars. AND 164 makes one leg 185 of ANDs 157 and 158 and gates OR 186 to a non-inverting, snap action, time relay 187 to enable ANDs 188 and 189. If a taxi call is present it gates one of ANDs 188 or 189. A high taxi call gates 188 and a low taxi call gates 189.

ANDs 188 and 189 make up a second leg of the high taxi call car assigned ANDs 151, 153, 155 and 157 and low taxi call car assigned ANDs 152, 154, 156 and 158. In the assumed case of car #4 available, a taxi call at floor thirteen as identified by the taxi scanner imposes a signal on lead 101 whereby AND 157 is enabled. If the taxi call finder or scanner is not running, so that no positive signal is present on lead 73 from the serializer of FIG. 4, inverter 191 permits AND 157 to be gated thereby assigning car #4 a high taxi call. The signal from lead 192 is coupled to each taxi register for car #4 for a floor in the high zone, floors eleven through thirteen in the example. The taxi register having the signal from lead 192 in coincidence with the taxi scanner signal is thus set to condition the car for taxi service to that floor. Had the taxi call found by the scanner been located during its ascending scan sequence and thus produced a signal on lead 115 indicative of a low taxi call to be assigned, AND 188 would have been gated to AND 158 to issue a "car #4 assigned low taxi call" signal on lead 193. This signal is coupled to the taxi registers for the low zone of floors for car #4, floors three through ten in the example. That register for the floor at which the taxi scanner is positioned is thus set for car #4.

When car #4 has a taxi register set, the register issues a "car #4 has a taxi call" signal on lead 176 from FIG. 7 to FIG. 6. This signal is passed through blocking rectifiers 194 to bar the taxi service car from all other service. Thus, registration of all commands to the car are inhibited by a signal on lead 195 to each of the car's command memories and allotment of any demands for the car is inhibited by a signal on lead 196 to the car's allotter, thereby preventing subsequently imposed service requirements. Existing service requirements are cancelled by resetting all commands for the car by a signal on lead 197 to each of its command memories and resetting all demands for the car by a signal on lead 198 to each of its demand memories.

FIG. 7 shows controls individual to each car for one car for the typical floors three and thirteen. Each of the outputs from FIG. 7 is connected parallel with other outputs from similar circuits so that intercoupling of the several sources is avoided by isolating diodes 199. A signal "call at floor where car is" is derived from AND 201 for floor three, from AND 202 for floor thirteen and from similar ANDs for every other floor served by that car and are coupled beyond the isolating diodes 199 to the common lead 178 which feeds the lead 178 in FIG. 6. Existence of a command at the floor or a set taxi register for the floor gates OR 203 from lead 204 or 205 respectively to enable AND 201. If the car is at the floor, AND 201 is gated by the signal on lead 206. These factors are treated similarly for each floor.

The presence of calls requiring service of the car beyond the floor is also sensed for each floor in the circuits of FIG. 7 to produce a "memory below the car" signal to lead 166 and a "memory above the car" signal to lead 207. These signals are coupled for each floor to a common input for the car control as in the case of floors one through twelve for "memory below the car" signals to lead 166 of FIG. 6. Any call imposed upon the car for the floor gates OR 203 in the case of floor three as from lead 204, for a command, from lead 205 for a taxi, call, from lead 209 for an up demand and lead 211 for a down demand. AND 212 is gated by any call for floor three when the car is below floor three as signified from the car's position indicator (not shown) on lead 213 through the coincidence of signals from OR 209 and lead 213. AND 214 is gated by a call for floor three when the car is above floor three as indicated by a signal on lead 215 to indicate a "memory below the car" to lead 166.

Since the car cannot be above floor thirteen, in the example, no means to generate a "memory below the car" for calls for floor thirteen is provided or shown in FIG. 7. Similarly, in the case of the first floor the car cannot travel below that floor and calls for that floor cannot be represented by a "memory above the car" signal hence no such signal source is provided for the first floor.

Each floor to which taxi service is provided has a taxi register for each car providing taxi service. The taxi register for floor three and car #4 is set through AND 216 which is gated by a coincidence of the car being in group service to impose a signal on lead 217, the taxi call finder being at the third position to indicate "taxi scanner is at three or thirteen" on lead 59, and car #4 being assigned a low taxi call on lead 193 from FIG. 6. Had the taxi call been for floor thirteen the signals would have been on leads 217, 59 and 192 to gate AND 218. Thus the scanner identifies both the third and thirteenth taxi registers for all cars providing taxi service and the taxi call assignment ANDS 151 to 158 of FIG. 6 identify the register of car available for taxi duty and of the zone of floors of the taxi call found by the scanner as indicated by the direction for which the scanner is set to scan.

When set, a taxi register issues a signal to the taxi memory circuits of FIG. 3 so the taxi scanner is released to hunt for any additional unassigned taxi calls. A "taxi call at thirteen is assigned" signal is issued to the thirteenth taxi memory on lead 53 from FIG. 7 to FIG. 3. Since each car has a taxi register for thirteen and reset signals from those registers are connected to the common lead 53 for the single taxi memory, isolation between the several register circuits is provided by diode 199.

A set taxi register also indicates the car is on taxi service by issuing to lead 176 of FIG. 6 a "this car has a taxi call" signal. All taxi registers for a car are connected to lead 176. Hence, this signal lead from each taxi register is also isolated by a diode 199.

Reset of a taxi register is accomplished by the arrival of the car assigned taxi service at the slowdown point in its travel for a stop at the floor of the taxi call it is assigned. The reset signal is applied to the reset input of the third floor taxi register 219 from OR 221 which is gated by inverter 222 if the car is removed from group service and the positive signal on lead 217 eliminated. In like manner, all other taxi registers are reset for a car removed from group service as by inverter 223 gating reset OR 224 for the thirteenth floor taxi register 225. Removal of a car from group service is an abnormal condition and does not satisfy the traffic requirements represented by the taxi call. Hence this type of reset of a taxi register merely releases the taxi call while the call memory retains the taxi timer for the call registered. The taxi scanner will therefore process the timed out call as previously described and cause its assignment to a new car when such car becomes available for taxi duty. In this manner lockup of a taxi call is avoided when the car is removed from group service or fails to serve due to some malfunction.

The normal reset of a taxi register through the response of the taxi car assigned that taxi call is derived from the car's demand memory reset for that floor (not shown). In the case of car #4 and floor three the reset signal is that used to reset the third down demand memory for car #4 as applied on lead 226 to gate OR 221. Such a signal requires the arrival of the car at its slowdown position for the floor of the taxi call, the setting of the car for a down destination direction, the effective presence of the car at the floor of the taxi call, and the absence of a door close request signal, all sensed by means not shown. This means also resets the demand memory for that floor and service direction for any other car, the hall call memory for that floor and service direction and the taxi timer for that floor. Thus the response of the taxi car at the taxi floor will reset all memories for the call since the reset of the taxi register develops a reset signal on its reset output 227 to the taxi call memory of FIG. 3. The coupling between the taxi register reset output and the taxi call memory reset input is through a capacitance 228 since only the initial reset impulse is effective. A direct coupling, even through the isolating diode 199, would maintain a reset signal on the taxi call memory while the taxi register was reset.

It is to be noted that the hall call, commands and demands can be reset for a taxi call without resetting the taxi register for that call for the car assigned taxi service. As discussed above this feature insures that an empty car, one which has concluded its down travel before accepting taxi duty, will serve the taxi call even if other cars which may be partially loaded also serve the landing and direction of that call.

If desired, the system can be arranged so that the stop of any car at the floor and set to serve in the service direction of a taxi call will reset the taxi register, the taxi timer, the taxi duty assignment, the hall call memory and the demand memory for that call. Thus all demand memory reset outputs can be pulse coupled to taxi register reset inputs whereby any demand memory reset will reset the taxi register. The reset taxi register will reset the taxi call memory.

When a car is released from taxi duty, as when its taxi register is reset, it terminates its signal blocking commands and allotted demands at leads 195 and 196 of FIG. 6 as well as the reset of commands and demands at leads 197 and 198. Thereafter the car will respond to the normal functions of the system.

FIG. 8 illustrates in logic form a portion of the system depicted in functional form for integration with the system of FIG. 1 by substitution for the equipment enclosed in dashed lines in FIG. 1. In this embodiment the interval each down hall call is registered is converted to an analog signal the level of which is a function of that interval. Thus the oldest call represents the largest signal. A ramp generator produces a signal which decreases with time from a level above or at the maximum attainable by the analog signals. The ramp signal is periodically compared with each analog signal for each taxi call in comparators individual to each call. Upon coincidence of the largest analog signal with the ramp signal a flip flop is actuated as a taxi call memory.

Since only one taxi call can be allotted at a time, an interlock is provided against the contingency of two or more unassigned taxi call memories set simultaneously. This interlock can be of the nature of the taxi call finder or taxi scanner of FIGS. 4 and 5 wherein the taxi call memory positions are scanned until a set taxi call memory is found. When it is found the scanner is inhibited until a car available for taxi duty is assigned the call. When a car's taxi register is set, the interlocking call finder is released to hunt another taxi call.

During operation of the interlocking call finder the ramp generator is inhibited. Thus, ordinarily only one taxi call is identified. Where two or more are identified simultaneously, the call finder, after assignment of the first, continues to hunt to find another. The ramp generator is inhibited until no unassigned taxi call memory is set.

When the taxi calls of unassigned taxi call memories are assigned to taxi registers of cars available for taxi duty, the taxi call timer and taxi call memory are reset. Car response to the set taxi call memory is as set forth with respect to FIG. 7 and the identification and assignment of cars for taxi duty is as set forth in FIG. 6.

Where elements corresponding to those previously discussed are employed in FIG. 8, like reference characters will be utilized with primes to distinguish them from their predecessors. A set down hall call memory, as for floor thirteen, applies a positive signal on lead 26 to enable clock gate 31' to pass pulses from clock 32' to binary counter 34'. Clock 32' can be provided with means to adjust its pulse rate as between one pulse per second and one pulse every fifteen seconds. Binary counter 34' is a four stage binary capable of a count of up to fifteen. When each stage is gated, it connects an analog summing resistor 229 to ground whereby an analog signal representative of the number of clock pulses and thus the call registration time is developed in the operational amplifier 231. This signal is applied on lead 232 to comparator 233 and to a maximum level detector 234.

Ordinarily the comparator 233 for each floor for which taxi service is provided periodically is subjected to a ramp signal applied on lead 235 from ramp generator 236. The ramp interval is established by a clock 237 which is adjustable by virtue of a signal imposed at 238. The ramp signal is started at a level in excess of that represented for the interval of a fifteen count from counter 34' and declines progressively. A lower limit is set for the effective registration interval signal for the comparators 233 which represents the shortest registration interval considered as a taxi call. This lower limit is adjustably established by a signal on lead 239 and is applied to the comparators 233.

A down hall call registration interval represented by an analog signal in excess of that set on lead 239, when coincident in level with the descending ramp signal level, causes the comparator 233 to issue a setting pulse to taxi memory flip flop 241. This issues a set signal on output 242 which stops the ramp generator 236 and starts the interlocking ring counter 243.

OR 244 is gated by any unassigned taxi call memory to issue a signal on lead 245 to the set input of ramp inhibit flip flop 246. Ramp inhibit 246 issues a signal on its set output 247 to inhibit ramp generator 236. The ramp generator is inhibited until the taxi call has been assigned a car available for taxi duty. When such a car is identified, as by the controls of FIG. 6, and its appropriate taxi register set, as in FIG. 7, in a manner to be discussed, the set register issues a reset signal for the taxi call timing equipment. In the case of a thirteenth floor taxi call, a thirteenth taxi register set output signal is applied at lead 248 as a "taxi call at thirteen is assigned" signal to gate OR 249. The thirteenth taxi call register for each car is pulse coupled (as by a condenser, not shown) to an input of OR 249.

A reset of the taxi call interval counter 34' is accomplished for each counter stage from OR 249 through lead 251. The signal on lead 251 is coupled to the reset input of the thirteenth floor taxi call memory 241 to reset that memory. The signal from lead 251 also gates OR 252 to partially enable the ramp inhibit resetting AND 253 from lead 254. OR 252 can be similarly gated by the assignment of any other taxi call to any car.

With the thirteenth taxi call memory reset, the signal gating OR 244 is removed from lead 242 so that inverter 255 now gates AND 253 to reset ramp inhibit flip flop 246. Upon removal of the inhibit signal from lead 247 to ramp generator 236, the periodic ramp generation is resumed and the next oldest down hall call registration interval of sufficient length to be a taxi call is effective to be sensed and set its taxi call memory.

The interlock for preventing the presentation of two taxi calls which have been registered equal intervals to the car selected as available for taxi duty operates for each setting of a taxi call memory. When a taxi call memory is set and gates OR 244 a signal is passed on lead 256 which gates AND 257 and starts a clock 258 for ring counter 243. Ring counter 243 is advanced by clock pulses. For convenience consider the counter to have a number of positions corresponding to the number of floors for which taxi calls can be registered. When the counter advances to a position representing a taxi call, it passes a gating signal to an AND 259 which is enabled by the set signal from the taxi call memory. Thus for a taxi call at thirteen, coincidence of signals on leads 261 and 262 gates AND 259 to issue at lead 263 a "thirteen taxi call to be assigned" signal. This signal can be applied to each car's thirteenth taxi call register as at the lead 59, individual to AND 218 and separate from AND 216 in FIG. 7, to set the register of the car available for taxi duty. It is also applied to OR 264 to stop the scanner 243 and enable the selection of an available car.

The output from OR 264 is applied on lead 265 to both of leads 101 and 115 to gate the car assigned a taxi call ANDs 151 to 158 where no discrimination is required between scan directions as where the number of scan positions is equal or exceeds the number of taxi service floors. These gated ANDs thereby enter into the setting of the taxi registers. Further the signal on lead 265 inhibits the scanner clock 258 by causing inverter 266 to inhibit AND 257. This holds the clock and the ring counter position until the taxi call register is set for the car available for taxi duty and until the taxi timer and taxi call memory have been reset. As in the first embodiment no car can be assigned while the taxi scanner is running. An inhibit signal is issued and passed on lead 73' to FIG. 6 from clock 258 while it is clocking the scanner. This signal through inverter 191 of FIG. 6 blocks each car assigned taxi duty AND 151 through 158. When the clock is inhibited the car assignment inhibit is removed. It is to be appreciated that if the number of scan positions for scanner 243 equals or exceeds the number of floors given taxi service only one car assigned taxi call AND is required for each car.

The scanner 243 can run for a second set taxi call memory, as where two taxi calls are of equal age, while the ramp generator remains inhibited. Thus, once a taxi call is assigned and its memory reset to inhibit AND 259, OR 264 removes the inhibit from inverter 266 to AND 257 and the scanner clock 258. In the assumed condition another taxi call memory is set to hold OR 244 gated and hold the ramp inhibit 246. The scanner runs until it finds the next set taxi call memory and gates its AND 259 to inhibit the scanner clock through OR 264 until that taxi call to be assigned is accepted by a car available for taxi duty. Once the car's taxi register is set, the taxi timer and taxi memory are reset by gating OR 249 for the taxi floor. This again releases the clock for the scanner and, if no other taxi memory has been set, permits the ramp inhibit flip flop to be reset.

When the system approaches a condition where taxi calls stack up as where there are more taxi calls than cars available for taxi duty, the continued timing of the calls loses its significance. Relative age of the calls is the significant factor in determining the order of taxi service to them. In view of this, when conditions approach saturation, the timing is detented whereby the taxi interval is extended without requiring a time accumulator of greater capacity, such as by additional stages in the counter 34'.

Each taxi call timer is provided with a maximum level detector 234 which can take the form of a comparator having a fixed threshold of operation. When a taxi timer issues a signal of the threshold level, a signal is issued to OR 267. OR 267 gates OR 268 to inhibit clock 32' for the taxi timer. Thus all taxi timing is held in abeyance until the call of the maximum level has been reset. This being the oldest call it should be the next to be assigned as a taxi call to its memory. When the taxi register for the call is set and issues the reset to taxi time counter 34' for the call, the signal from amplifier 231 is removed from the maximum level detector 234 to eliminate the taxi timer clock inhibit from this source.

Another source of an inhibit signal to OR 268 is AND 269. AND 269 is gated by the setting of all cars for taxi duty as indicated from a taxi call assigned AND of the family 151 to 158 in FIG. 6 for each car. Since a car is assigned a taxi call only while running to the taxi call and releases that assignment when it picks up a slowdown signal to stop at the floor of the taxi call, a coincidence of all four cars on taxi service is quite unusual. Timing can be deferred to advantage when the cars are serving the taxi calls. Accordingly, a time delay in release of the signals on leads 271, 272, 273 and 274 for cars 1 to 4 can be employed of such length as to retain the signal for the interval normally required for the car to serve the taxi call. Thus the release of the taxi call assigned AND for the car can set a time delay for an interval of the car's slowdown to a stop at the taxi call, average loading interval, and average interval of a run to the usual taxis call destination, the lower floor having an exit in a down call taxi service arrangement.

It is to be understood that the present system of providing taxi service can be accomplished for many types of group supervisory elevator controls.

The concepts of assigning a car which is completing its service in the direction of a taxi call exlusively to that call to cause it to run as an empty car directly to the floor of that call lends itself to elevator systems of conventional form as typified by R. A. Burgy United States patent application Ser. No. 808,290 which was filed Mar. 30, 1959 and is entitled Elevator Controls. The logic functions disclosed above can be accomplished by electromagnetic switches or by electron discharge device switches.

The preceding disclosure represented a preferred form of the invention wherein hall call buttons, as the means to register hall calls, cause the cars to stop at the floors of those calls through suitable controls of the type detailed in the aforenoted Hall et al. applications. Ordinarily those registered calls as stored in hall call memories 25, 29 are answered and reset promptly in these systems. When response is delayed, a timer such as the clock 32-counter 34 combination senses the registration of the call beyond a predetermined interval and designates it as a taxi call by setting a taxi call memory 45, 47. With a taxi call memory set, a car which is in a suitable given service condition, either as a free car having no calls to serve or a car which has completed a trip to the last call in its service direction, is designated as a taxi car by gating ANDs 165 to 164 to 188 to 189 and 157 or 158. The taxis car when selected by the taxi car designating means in conjunction with the identified taxi call sets the car to serve the call through taxi registers.

A car set for taxi service is prevented from being diverted in its service to its taxi call by a signal from its taxi register as at lead 176 to inhibiting circuits for the imposition on the taxi car of car or hall calls at 195 and 196 and for resetting any exiting car or hall calls at 197 and 198. The selected car therefore is excluded from service to calls for any floor other than that of its taxi call. When it serves at that floor the taxi register is reset to release the inhibiting means and the car returns to regular service.

Two modes of resetting taxi call memories and taxi call registers are shown. One is by the service of any car to the floor of the taxi call, represented by the closure of switch 17 in FIG. 1 and accomplished by coupling reset lead 30 of FIG. 3 to reset lead 43 of FIG. 3 for the taxi call memory and reset OR 224 of FIG. 7 for the taxi register. Advantageously, the reset of the taxi call memory and taxi call register can be accomplished only by the service of the taxi car at the floor of the taxi call to apply a reset to OR 224. Flip flop taxi call registers having reset outputs which issue signals continuously while they are reset have been employed. In order to avoid locking up the taxi call memories which are reset from the taxi call registers, pulse coupling through capacitors, as 228 of FIG. 7, have been employed between the taxi call register reset output and the taxi call memory input, as 43 of FIG. 3.

A scanner has been disclosed which functions as a taxi call finder employing fewer scan positions than the number of floors which are to be scanned for taxi service. The scanner has a capacity up to twice the number of scan positions since it scans one group of floors while advancing in an ascending scan direction and another group of floors while advancing in a descending scan direction. A clock 66 advances the scanner during a portion of its cycle. In order to utilize the limiting or extreme scan positions in each group a serializer control for the scanner inhibits scan advance during the first clock cycle the scan is at one scan limit and retains the scan direction setting. In the following clock cycle the scan direction is reversed to include the scan position in the second scan sequence. Then the scan is advanced to a new position.

A form of taxi call selection is shown in FIG. 8 which causes the taxi call which has been registered longest to be chosen for assignment. An analog signal is generated by counter 34' and amplifier 231 which has a level according to the registration interval of the call. A ramp signal generator 236 produces a signal which changes with time from a level corresponding to the analog signal representing the maximum registration time represented by the timer to a level corresponding to the analog signal representing the minimum registration time of a taxi call. The ramp signal and timer signals are compared in comparators 233 one of which issues a selection signal for a taxi call when a predetermined relationship between those signals is sensed. This signal sets the taxi call memory 241. A second comparator 234 for each taxi call detents the taxi timer when any call exceeds a certain level. Detent of this timer can also be accomplished if a given number of taxi cars are selected as by gating their ANDs 151 to 158 within a given time interval. In the example the detent is shown effective when all cars have their assigned taxi call ANDs gated simultaneously.

In view of the number of alternative utilizations of this invention, the variations in the elements employed to accomplish the inventive concepts, and the different combinations of elements available for the elevator control operations set forth, it is to be understood that the present disclosure is to be read as illustrative and not in a limiting sense.

Having described the invention, we claim:

1. A control for an elevator system having a plurality of cars serving a plurality of floors, up hall call registering means, down hall call registering means, car call registering means for each car for registering calls for service from within said car, means for assigning each registered hall call to an individual car, means for stopping a car at a floor in response to a hall call only in the event that the hall call is assigned to the car, means for measuring the time interval of registration of down hall calls for certain floors, means responsive to said time measuring means for designating as a taxi call a call which has been registered greater than a predetermined time interval, means for selecting a car which has no hall calls assigned for floors below its current position as a taxi car to serve an individual taxi call, means to cause a selected taxi car to travel to the floor of the taxi call which it was selected to serve, means effective while said car is a selected taxi car to inhibit said car call registering means for said car and to inhibit assignment of hall calls to said selected car by said assigning means, and means to release said car from selected taxi car status in response to service by a car at the floor of the taxi call which said taxi car was selected to serve.

2. In an elevator control for a plurality of elevator cars serving a plurality of floors including, means to register hall calls for floors served by said cars, control means for controlling operation of the cars for causing said cars to run to and stop at the floors for which said hall call register means are operated, means to reset said hall call register means in response to service by a car at the floor of said operated register means, time interval measuring means for measuring the interval of registration of each of a plurality of hall call registering means, the improvements which comprise means for designating as a taxi call each of a plurality of hall calls registered for greater than a predetermined interval ascertained by said time interval measuring means, means to designate cars which are in a given service condition as taxi cars, and means to select an individual taxi car for exclusive service to an individual taxi call, whereby a taxi car serves but one taxi call for each operation of said taxi car designating means with respect to said car.

3. A combination according to claim 2 including means to set a selected car to run to the floor of said taxi call for which it is selected without stops at other floors.

4. A combination according to claim 3 including car call registering means for each car for registering calls for service from within said car, and means to inhibit a car selected to serve a taxi call from responding to its car call registering means and hall call registering means for other than the floor of said taxi call for which it is selected.

5. A combination according to claim 4 including means to inhibit said means to inhibit response to calls in response to service by said selected car at the floor of said individual taxi call.

6. A combination according to claim 2 including means to assign said selected car to taxi service for the floor of said taxi call and means to reset said taxi call and said assignment means in response to service by a car at the floor of said taxi call.

7. A combination according to claim 2 including means to select a taxi call from among a plurality of taxi calls for assignment to a selected taxi car.

8. A combination according to claim 7 wherein said taxi call selecting means includes means for scanning in a sequence based upon spatial distribution for service by said cars each of a plurality of floors for which taxi calls can be registered whereby taxi calls are selected on the basis of their spatial distribution.

9. A combination according to claim 8 wherein said scanning means has a range of scan positions including fewer scan positions than the number of floors for which taxi calls can be registered, means for reversing the scanning direction of said scanner at predetermined scan position limits bounding said range, and means for identifying scan positions with the floors for which taxi calls can be registered by a coincidence of scan position and scanning direction.

10. A combination according to claim 7 wherein said selecting means selects the taxi call which has been registered for the longest interval.

11. A combination according to claim 10 including means to generate an analog signal of registration time for each hall call, means to generate a ramp signal which changes with time from a level corresponding to the analog signal representing the maximum registration time to a level corresponding to the analog signal representing the minimum registration time of a taxi call, and a comparator for actuating said selecting means in response to a predetermined relationship between said ramp signal and said analog signal.

12. A combination according to claim 2 including means to suspend the measurement of time by said time interval measuring means in response to the selection in a given time period of a predetermined number of taxi cars.

13. A combination according to claim 2 including mean to suspend the measurement of time by said time interval measuring means in response to the registration of a hall call for a predetermined time interval of greater length than said taxi call designating interval.

References Cited

UNITED STATES PATENTS 2,854,096  9/1958  White et al. _________ 187—29

ORIS L. RADER, Primary Examiner

W. E. DUNCANSON, JR., Assistant Examiner